(12) United States Patent
Tang et al.

(10) Patent No.: US 7,917,323 B2
(45) Date of Patent: Mar. 29, 2011

(54) ADJUSTING METHOD AND DEVICE OF SENSITIVITY OF SIGNAL INTERPRETATION

(75) Inventors: Zong-Hong Tang, Taoyuan Hsien (TW);
Chin-Fa Chiu, Taoyuan Hsien (TW);
Po-Tsun Kuo, Taoyuan Hsien (TW);
Chun-Lung Chiu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 194 days.

(21) Appl. No.: 11/954,173

(22) Filed: Dec. 11, 2007

(65) Prior Publication Data

US 2008/0143313 A1 Jun. 19, 2008

(30) Foreign Application Priority Data

Dec. 18, 2006 (TW) .............................. 95147371 A

(51) Int. Cl.
*G01C 19/00* (2006.01)

(52) U.S. Cl. ........................................ 702/104

(58) Field of Classification Search ............. 702/138, 702/104; 604/67; 415/47; 318/471
See application file for complete search history.

(56) References Cited

U.S. PATENT DOCUMENTS

| 6,188,189 | B1 * | 2/2001 | Blake ............. | 318/471 |
| 7,206,715 | B2 * | 4/2007 | Vanderveen et al. ...... | 702/138 |
| 7,255,680 | B1 * | 8/2007 | Gharib ............. | 604/67 |
| 2007/0297893 | A1 * | 12/2007 | Alon et al. ........... | 415/47 |

* cited by examiner

*Primary Examiner* — Tung S Lau
*Assistant Examiner* — Xiuquin Sun
(74) *Attorney, Agent, or Firm* — Birch, Stewart, Kolasch & Birch, LLP

(57) ABSTRACT

A method of adjusting sensitivity of signal interpretation includes the steps of: continuously receiving an input signal; setting a sampling parameter; sampling the input signal according to the sampling parameter to obtain a plurality of sampling signals; judging whether the sampling signals are the same or not; generating a first control signal according to the sampling signals if the sampling signals are the same; and generating a second control signal according to the input signal if the sampling signals are not the same. A device of adjusting the sensitivity of signal interpretation is also disclosed.

11 Claims, 9 Drawing Sheets

ADJUSTING METHOD AND DEVICE OF SENSITIVITY OF SIGNAL INTERPRETATION

CROSS REFERENCE TO RELATED APPLICATIONS

This Non-provisional application claims priority under 35, U.S.C. §119(a) on Patent Application No(s). 095147371, filed in Taiwan, Republic of China on Dec. 18, 2006, the entire contents of which are hereby incorporated by reference.

BACKGROUND OF THE INVENTION

1. Field of Invention

The invention relates to an adjusting method and an adjusting device, in particular, to an adjusting method and an adjusting device of adjusting sensitivity of signal interpretation in the field of fan control.

2. Related Art

A conventional fan system is typically driven by an electronic system, wherein the fan system has a controller or a control chip, and the controller or the control chip generates a control signal to control a rotating speed of a fan according to a change of a duty cycle of a pulse width modulation (PWM) signal, which is continuously inputted by the electronic system.

Referring to FIG. 1, a conventional fan system 1 electrically connected to an electronic system 2 of a client includes a fan 11 and a controller 12. The electronic system 2 continuously inputs a pulse width modulation signal PWM to the controller 12 to control a rotating speed of the fan 11. The fan system 1 rapidly and continuously samples the pulse width modulation signal PWM in a fixed manner to detect the continuity and the stability of the pulse width modulation signal PWM as a reference for judging the system state. As shown in FIG. 2A, the typical pulse width modulation signal PWM has a rectangular wave with a constant cycle T. However, when the fan system 1 operates in different environments with different noises, the endurance against the noises is not completely kept unchanged. The noises can be easily inputted together with the pulse width modulation signal PWM, as shown in FIG. 2B. The pulse width modulation signal PWM is interfered by the noises so that the waveform is changed to cause the miss step (MS) phenomenon, for example. Therefore, when the fan system 1 samples the pulse width modulation signal PWM, mis-judgment may be made to cause the malfunction.

Because the operating environment of the fan system 1 is changing, the sensitivity of signal interpretation is influenced if the endurance against the noises cannot be adjusted correspondingly. Furthermore, the fan system 1 itself cannot judge whether the pulse width modulation signal PWM has the noise N or not. So, when this condition occurs, the rotating speed of the fan 11 is unstable, the operation of the fan system 1 is influenced, and the heat dissipating efficiency is deteriorated.

SUMMARY OF THE INVENTION

In view of the foregoing, the invention is to provide an adjusting method, and an adjusting device capable of detecting whether an input signal is abnormal or not, and adjusting sensitivity of signal interpretation.

To achieve the above, the invention discloses a method of adjusting sensitivity of signal interpretation. The method includes the steps of continuously receiving an input signal, setting a sampling parameter, sampling the input signal according to the sampling parameter to obtain a plurality of sampling signals, judging whether the sampling signals are the same or not, generating a first control signal according to the sampling signals if the sampling signals are the same, and generating a second control signal according to the input signal if the sampling signals are not the same.

To achieve the above, the invention also discloses a device of adjusting sensitivity of signal interpretation. The device includes a receiving module, a setting module, a sampling module and a judging module. The receiving module continuously receives an input signal. The setting module sets a sampling parameter. The sampling module samples the input signal to obtain a plurality of sampling signals according to the sampling parameter. The judging module judges whether the sampling signals are the same or not, generating a first control signal according to the sampling signals if the sampling signals are the same, and generating a second control signal according to the input signal if the sampling signals are not the same.

In addition, the invention further discloses a method of adjusting sensitivity of signal interpretation. The method includes the steps of continuously receiving an input signal, setting a sampling parameter, sampling the input signal according to the sampling parameter to obtain a plurality of first sampling signals, calculating a first average of the first sampling signals, re-sampling the input signal according to the sampling parameter to obtain a plurality of second sampling signals, calculating a second average of the second sampling signals, judging whether the first average and the second average are the same or not, generating a first control signal according to the sampling signals if the first average and the second average are the same, and generating a second control signal according to the input signal if the first average and the second average are not the same.

In addition, the invention further discloses a device of adjusting sensitivity of signal interpretation. The device includes a receiving module, a setting module, a sampling module, a calculating module and a judging module. The receiving module is used to continuously receive an input signal. The setting module is used to set a sampling parameter. The sampling module samples the input signal to obtain a plurality of first sampling signals and re-sampling the input signal to obtain a plurality of second sampling signals according to the sampling parameter. The calculating module calculates a first average of the first sampling signals and a second average of the second sampling signals. The judging module judges whether the first average and the second average are the same or not, generates a first control signal according to the sampling signals if the first average and the second average are the same, and generates a second control signal according to the input signal if the first average and the second average are not the same.

As mentioned above, the method and device of adjusting the sensitivity of signal interpretation of the invention have the following features. In this invention, a receiving module is provided to continuously receive an input signal, a sampling module is provided to sample the input signal to obtain a plurality of sampling signals according to the number of times of sampling set by a setting module, and a judging module is provided to judge whether the sampling signals are the same or not. Alternatively, a calculating module calculates two averages after the input signal has been sampled and re-sampled, and then the judging module judges whether the two averages are the same or not. When the averages are the same, a first control signal is generated according to the sampling signals. When the averages are not the same, a second control signal is generated according to the input signal. Compared with the prior art, the invention can judge whether the input signal has the noise or not according to different judging methods so as to eliminate the mis-judgment, and can further prevent the fan system from operating abnormally when the input signal has the noise. The sensitivity of input signal interpretation can be adjusted according to the number of times of sampling, the sampling cycle, the sampling time or the delay time in conjunction with the sampling parameters set in the system, and the heat dissipating efficiency of the fan system can be kept.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 3:
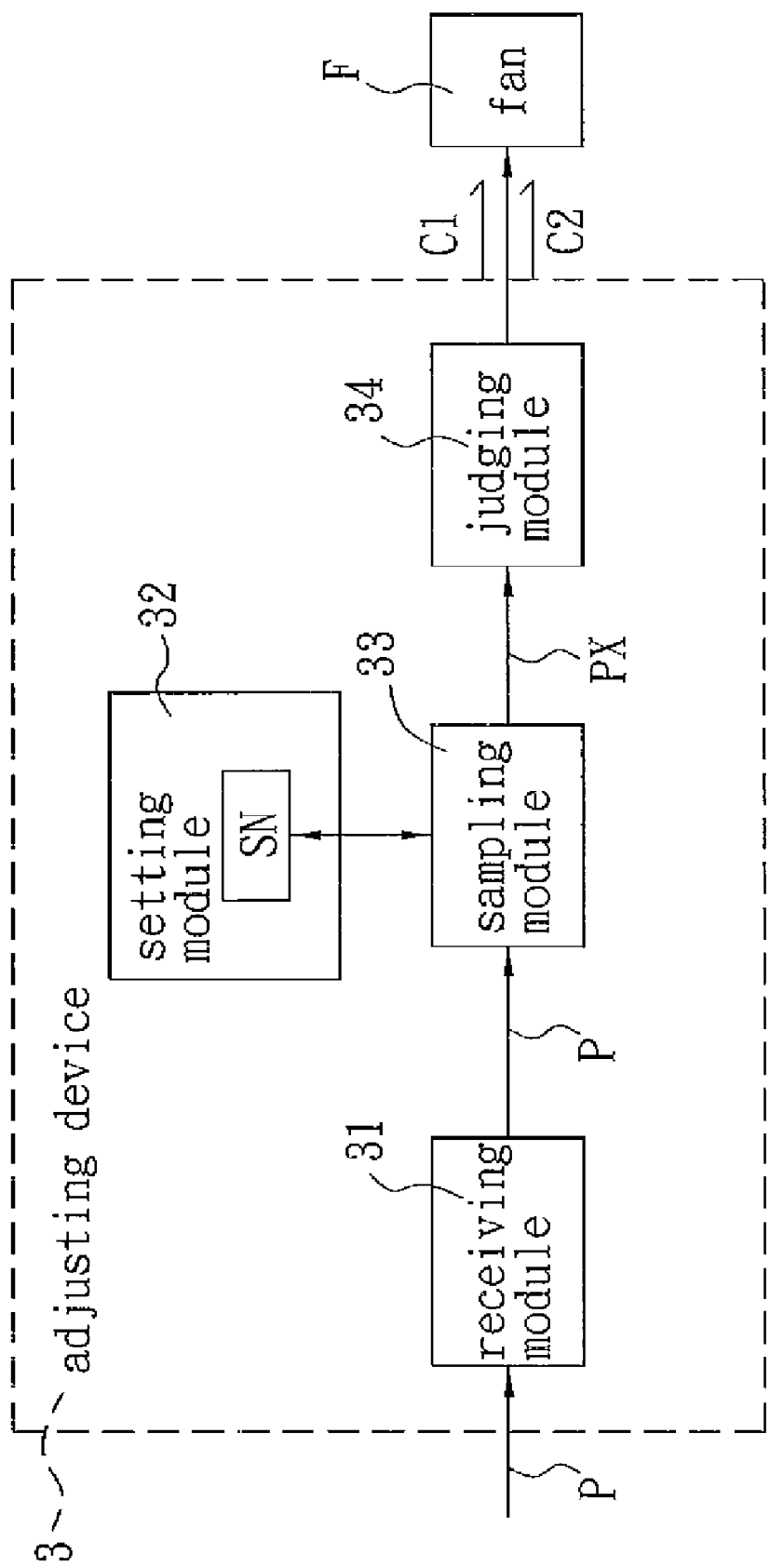
FIG. 3 is a schematic illustration showing an adjusting device of adjusting sensitivity of signal interpretation according to a first embodiment of the invention.

Referring to FIG. 3, an adjusting device 3 of adjusting sensitivity of signal interpretation according to a first embodiment of the invention includes a receiving module 31, a setting module 32, a sampling module 33 and a judging module 34. The application range of the adjusting device 3 is not particularly restricted and may be applied to a fan system to adjust a rotating speed of a fan F of the fan system.

The receiving module 31 is electrically connected with the sampling module 33, and continuously receives an input signal P so as to transmit the input signal P to the sampling module 33. In practice, the input signal P of this embodiment may be a pulse width modulation (PWM) signal.

The setting module 32 is electrically connected to the sampling module 33 and is for setting a sampling parameter, such as the number SN of times of sampling (sampling number), and the number SN may be inputted and set externally according to the practical requirement of a user or a customer. Although this embodiment is described according to the number of times of sampling, the sampling cycle, the sampling time or the delay time may be set as the sampling parameter in conjunction with the system setting so that the sensitivity of signal interpretation can be adjusted.

Figure 1:
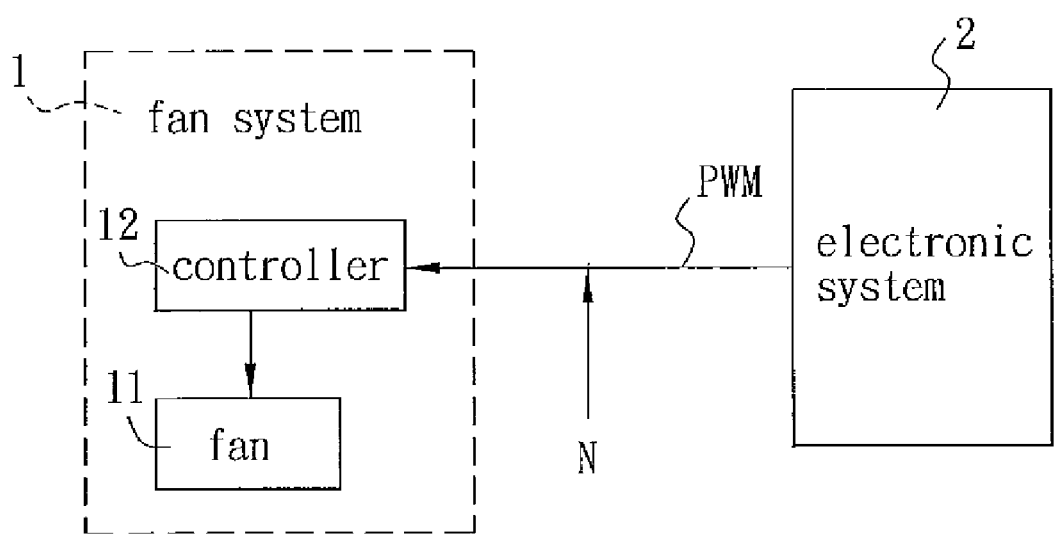
FIG. 1 is a schematic illustration showing a conventional fan system electrically connected to an electronic system.
Figure 2A:
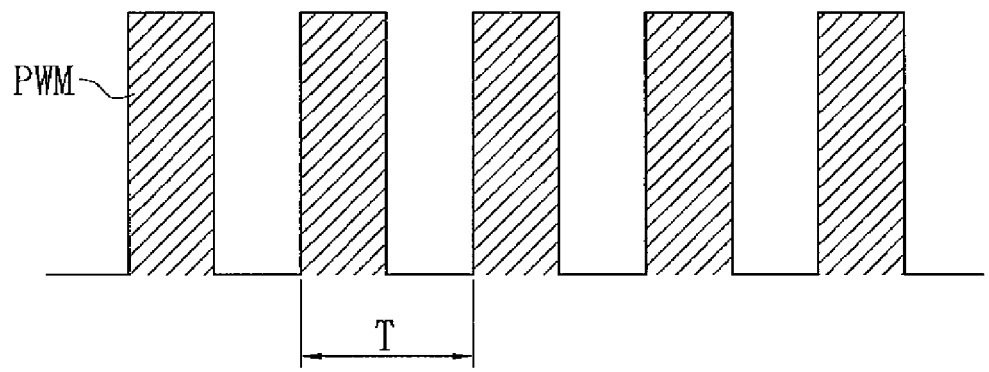
FIGS. 2A and 2B are schematic illustrations respectively showing a waveform of a typical pulse width modulation (PWM) signal and a miss step phenomenon caused by the noise.
Figure 2B:
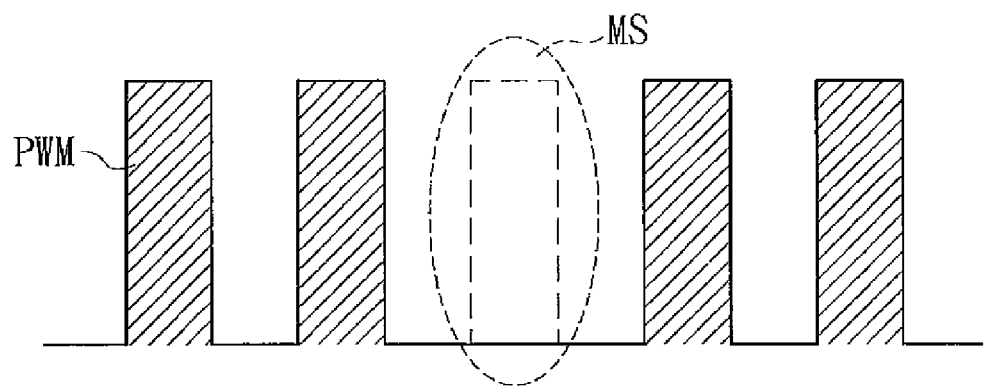

The sampling module 33 is electrically connected to the judging module 34, continuously receives the input signal P, and samples the input signal P at different time instants according to the number N of times of sampling to obtain a plurality of sampling signals PX. The input signal P may be continuously and sequentially sampled to obtain the sampling signals PX, or the input signal P is sequentially sampled every one interval time to obtain the sampling signals PX so that one interval time exists between the sampling signals PX. In addition, the sampling time of the sampling signals PX of this embodiment is not particularly restricted and may be, without limitation to, the time longer than or equal to two times of the constant cycle of the input signal P. For example, the sampling time is two times of the constant cycle T of FIG. 2A.

The judging module 34 receives the sampling signals PX and judges whether the sampling signals PX are the same or not. If the sampling signals PX are the same, a first control signal C1 is generated according to the sampling signals PX and is transmitted to the fan F so that the rotating speed of the fan F of the fan system is updated according to the first control signal C1. If the sampling signals PX are not the same, a second control signal C2 is generated according to the input signal P before being sampled so as to control the fan F to hold the original rotating speed.

After the judging module 34 has generated the first control signal C1 or the second control signal C2, the receiving module 31 again receives the input signal P so that the sampling module 33 again samples the input signal P.

The receiving module 31, the setting module 32, the sampling module 33 and the judging module 34 are implemented as software programs or hardware circuits, and are achieved by the software programs in this example. In addition, the receiving module 31, the setting module 32, the sampling module 33 and the judging module 34 may further be integrated in a processor.

Figure 4:
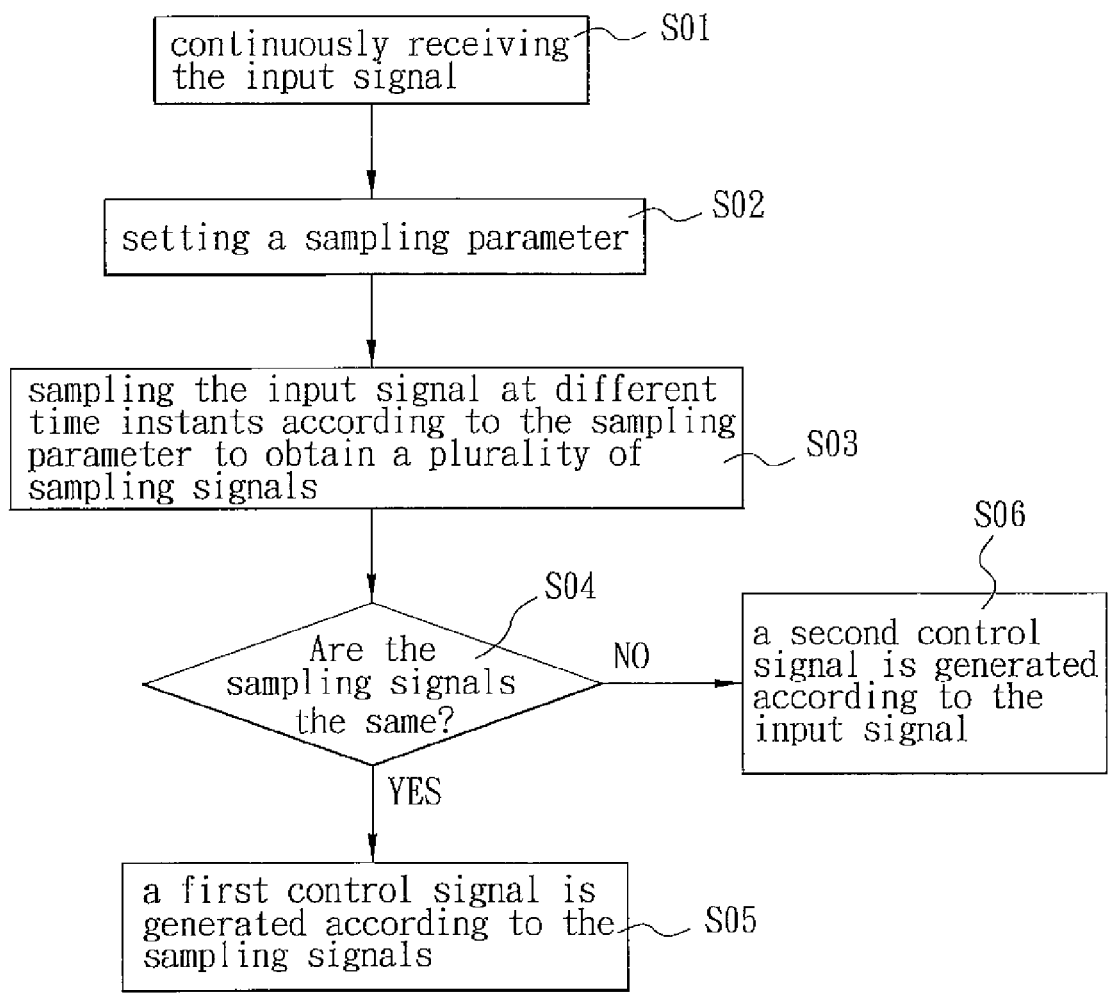
FIG. 4 is a flow chart showing an adjusting method of adjusting the sensitivity of signal interpretation in the adjusting device according to the first embodiment of the invention.

Referring to FIG. 4, an adjusting method of adjusting the sensitivity of signal interpretation in the adjusting device 3 according to the first embodiment of the invention includes steps S01 to S06.

In step S01, the input signal P, which is a pulse width modulation (PWM) signal, is continuously received.

In step S02, a sampling parameter, such as the number SN of times of sampling, which may be inputted and set externally according to the requirement of the user or the customer, is set.

In step S03, the input signal P is sampled at different time instants according to the number SN of times of sampling to obtain a plurality of sampling signals PX.

In step S04, it is judged whether the sampling signals PX are the same or not, and step S05 or S06 is performed according to the judged result of the step S04.

In step S05, the first control signal C1 is generated according to the sampling signals PX if the sampling signals PX are the same.

In step S06, the second control signal C2 is generated according to the input signal P if the sampling signals PX are not the same.

Figure 5:
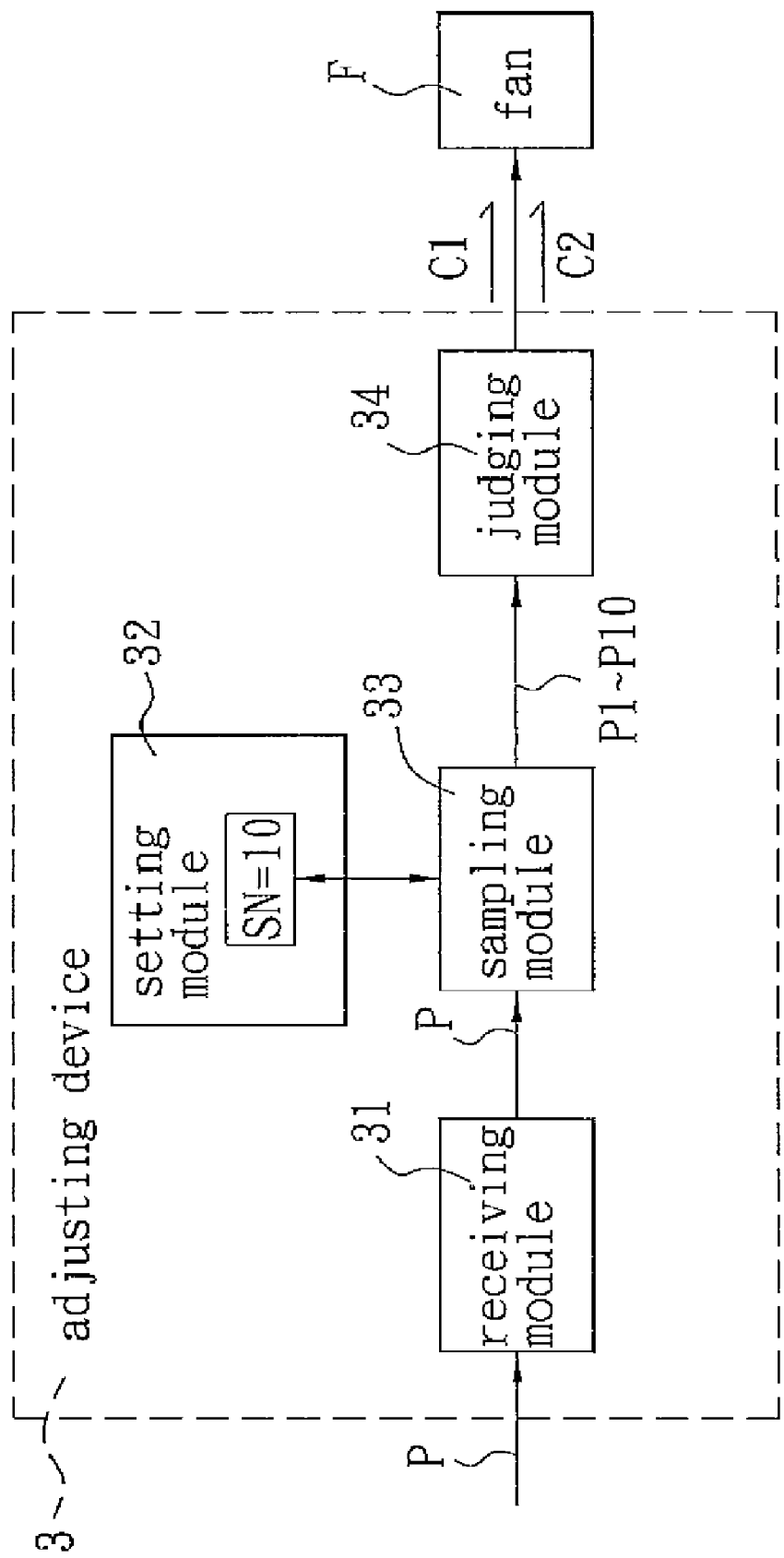
FIGS. 5 and 6 are schematic illustrations showing the adjusting device and the operations of the adjusting method according to the first embodiment of the invention.
Figure 6:
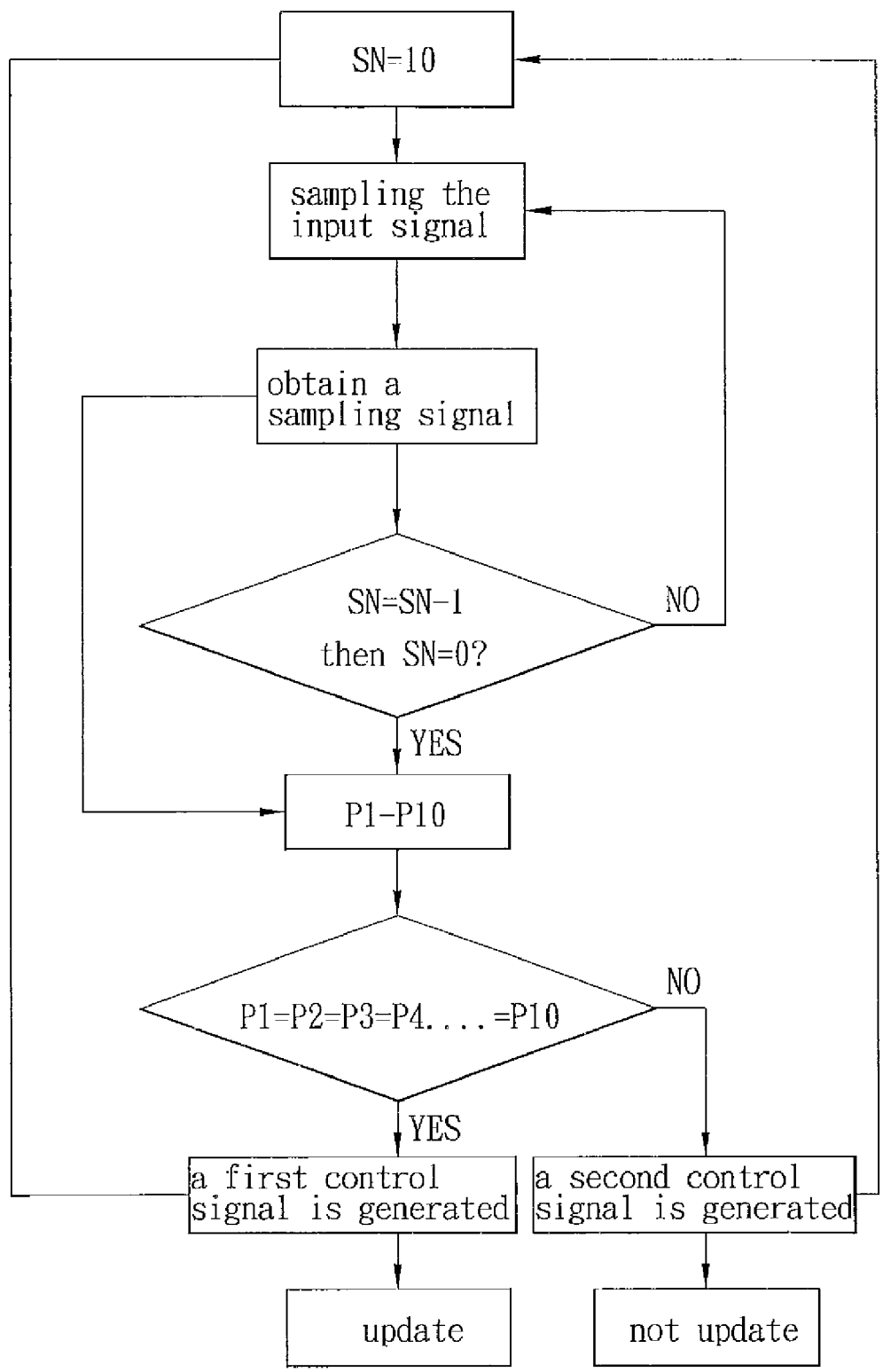

The operations of the adjusting method and the adjusting device 3 will be described with reference to the following example, which is achieved by, without limitation to, the software program. As shown in FIGS. 5 and 6, the adjusting device 3 has the receiving module 31 for continuously receiving the input signal P, the setting module 32 for setting the number SN of times of sampling as 10, and the sampling module 33 for sequentially sampling the input signal P at different time instants according to the number SN of times of sampling. When the sampling module 33 samples the input signal P at the first time, a sampling signal P1 is obtained. Then, a new number SN is obtained by subtracting one from the number SN of times of sampling, and it is judged whether the new number SN is equal to zero or not. If the new number SN is not equal to zero, the input signal P is again sampled after the interval time, such as 0.1, milliseconds. When the new number SN is equal to zero, the sampling operation is completed, and ten sampling signals P1 to P10 are obtained. The sampling signals P1 to P10 are transmitted to the judging module 34, and the judging module 34 compares the sampling signals P1 to P10 with each other to determine whether the sampling signals P1 to P10 are the same or not. If the sampling signals P1 to P10 are the same (P1=P2...=P10), the first control signal C1 is generated according to the sampling signals P1 to P10 to control and update the rotating speed of the fan F. If the sampling signals P1 to P10 are not the same (e.g., the signal P3 corresponds to the miss step phenomenon MS in the prior art so that P1=P2≠P3..., wherein P2≠P3 causes the sampling signals P1 to P10 to be not the same), the second control signal C2 is generated according to the input signal P so that the original rotating speed of the fan F is kept and is not updated. In addition, the receiving module 31 re-samples the input signal P according to the number SN of times of sampling after the first control signal C1 or the second control signal C2 has been generated. Changing the number SN of times of sampling can adjust the sensitivity of the adjusting device 3.

Figure 7:
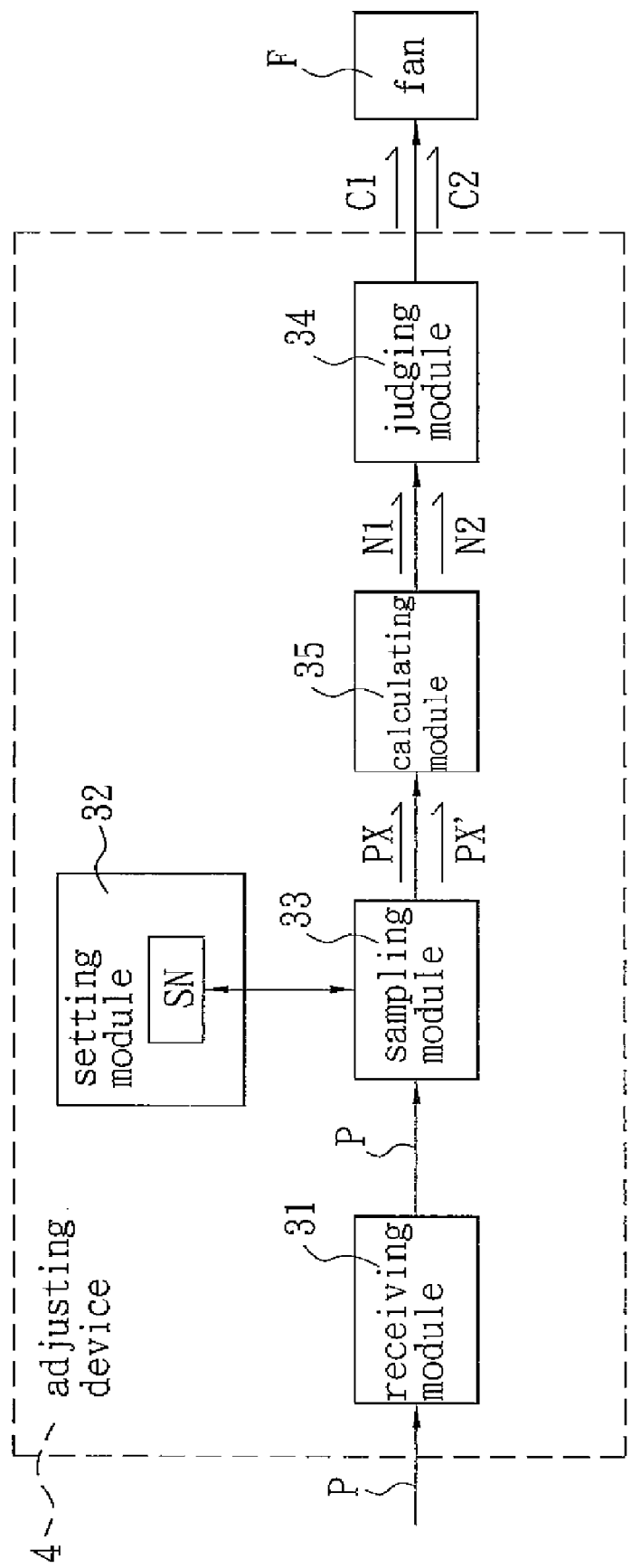
FIG. 7 is a schematic illustration showing an adjusting device of adjusting sensitivity of signal interpretation according to a second embodiment of the invention.

Referring to FIG. 7, an adjusting device 4 of adjusting sensitivity of signal interpretation according to a second embodiment of the invention includes a receiving module 31, a setting module 32, a sampling module 33, a calculating module 35 and a judging module 34. The differences between the embodiment and the first embodiment will be described in the following. First, the calculating module 35 is electrically connected to the sampling module 33 and the judging module 34, calculates an average N1 of the sampling signals PX, and transmits the average N1 to the judging module 34. Then, the sampling module 33 re-samples the input signal to obtain a plurality of sampling signals PX'. The calculating module 35 calculates the sampling signals PX' to obtain an average N2, and transmits the average N2 to the judging module 34.

The judging module 34 judges whether the averages N1 and N2 are the same or not. If the averages N1 and N2 are the same, the first control signal C1 is generated according to the sampling signals PX or PX' and then transmitted to the fan F to update the rotating speed of the fan F. If the averages N1 and N2 are not the same, the second control signal C2 is generated according to the input signal P so that the fan F holds the original rotating speed.

Figure 8:
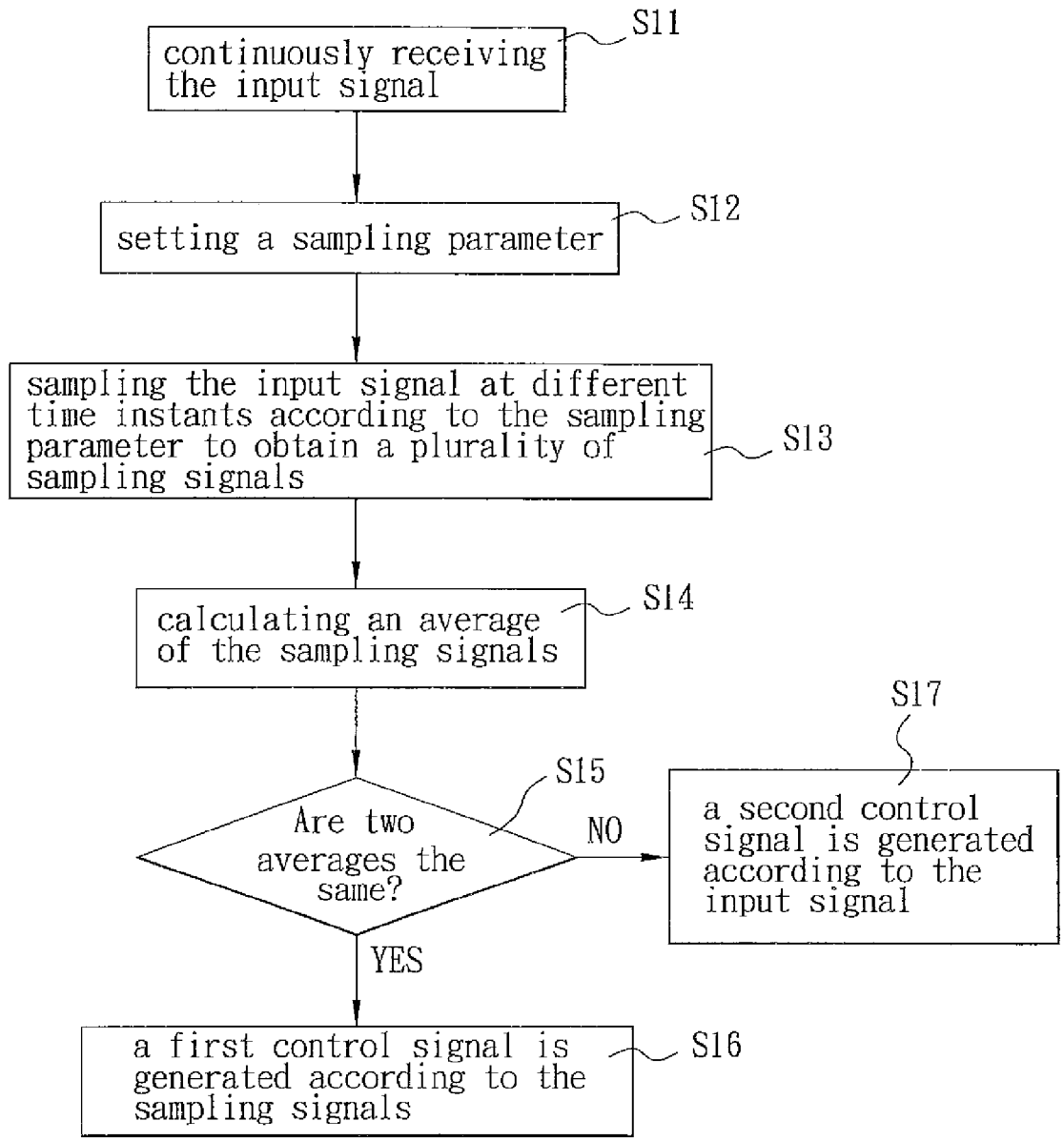
FIG. 8 is a flow chart showing an adjusting method of adjusting the sensitivity of signal interpretation in the adjusting device according to the second embodiment of the invention.

As shown in FIG. 8, an adjusting method of adjusting the sensitivity of signal interpretation in the adjusting device 4 according to the second embodiment includes steps S11 to S17. The features and functions of the steps S11, S12, S13, S16 and S17 are the same as those of the steps S01, S02, S03, S05 and S06 according to the first embodiment, so detailed descriptions thereof will be omitted. In the following, only the steps S14 and S15 are described.

In step S14, the calculating module 35 calculates an average N1 of the sampling signals PX. Then, a plurality of sampling signals PX' is obtained after re-sampling the input signal, and the calculating module 35 calculates the sampling signals PX' to obtain an average N2.

In step S15, it is judged whether the two averages N1 and N2 are the same or not. If the two averages N1 and N2 are the same, the first control signal C1 is generated according to the sampling signals PX or PX' in step S16. If the averages N1 and N2 are not the same, the second control signal C2 is generated according to the input signal P in step S17.

Figure 9:
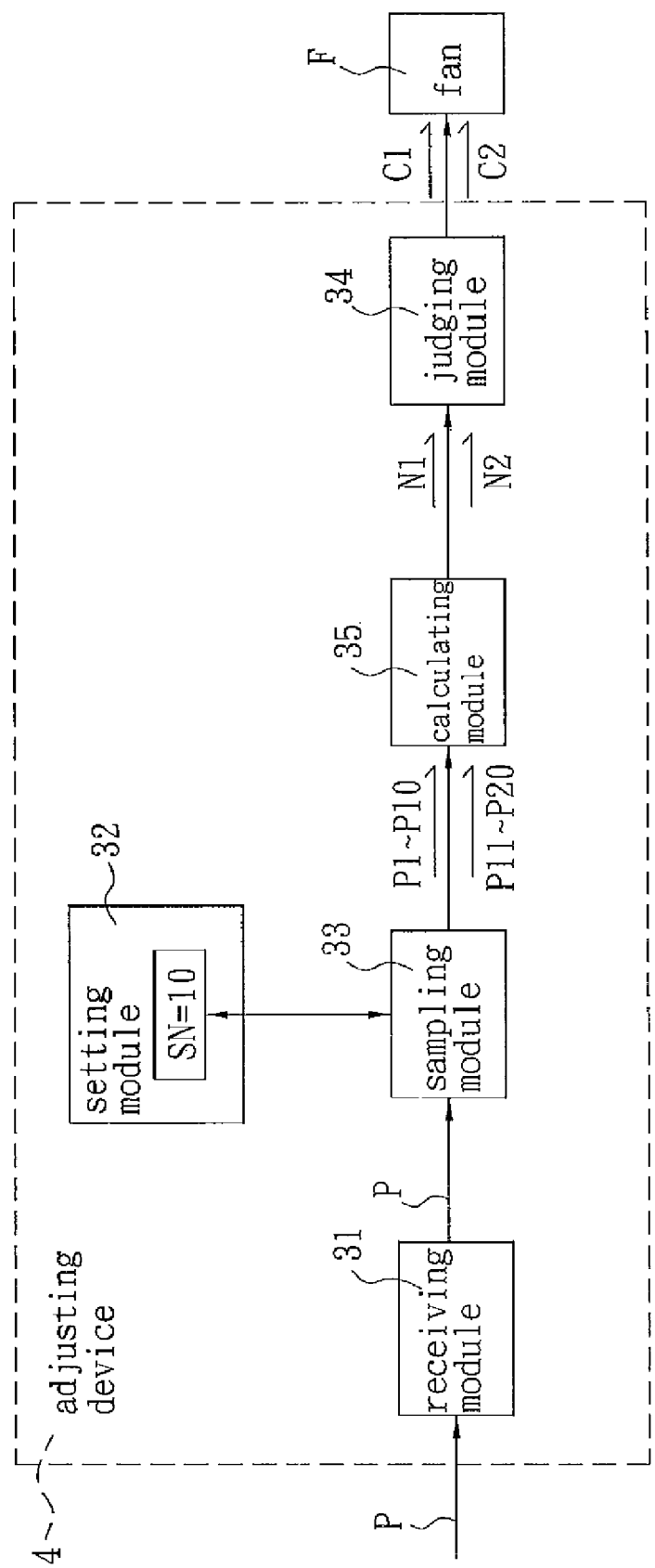
FIG. 9 is a schematic illustration showing operations of the adjusting method and the adjusting device according to the second embodiment of the invention.

The operations of the adjusting method and the adjusting device 4 will be described with reference to the following example, which is achieved by, without limitation to, the software program. As shown in FIG. 9, the setting module 32 sets the number SN of times of sampling as 10. What is different from the first embodiment is that the sampling module 33 sequentially samples the input signal P to obtain ten sampling signals P1 to P10, transmits the input signal P to the calculating module 35 to calculate the average N1 of the sampling signals P1 to P10, and then transmits the average N1 to the judging module 34 again. Next, the sampling module 33 re-samples the input signal P to obtain ten sampling signals P11 to P20, and transmits the sampling signals P11 to P20 to the calculating module 35. The calculating module 35 calculates the average N2 of the sampling signals P11 to P20, and then transmits the average N2 to the judging module 34. The judging module 34 compares the average N1 with the average N2 to determine whether the averages N1 and N2 are the same or not. If the averages N1 and N2 are the same, the first control signal C1 is generated according to the sampling signals P1 to P20 to control and update the rotating speed of the fan. If the averages N1 and N2 are not the same the second control signal C2 is generated according to the input signal P to control the fan F to hold the original rotating speed.

In summary, the method and device of adjusting the sensitivity of signal interpretation of the invention have the following features. In this invention, a receiving module is provided to continuously receive an input signal, a sampling module is provided to sample the input signal to obtain a plurality of sampling signals according to the number of times of sampling set by a setting module, and a judging module is provided to judge whether the sampling signals are the same or not. Alternatively, a calculating module calculates two averages after the input signal has been sampled and re-sampled, and then the judging module judges whether the two averages are the same or not. When the averages are the same, a first control signal is generated according to the sampling signals. When the averages are not the same, a second control signal is generated according to the input signal. Compared with the prior art, the invention can judge whether the input signal has the noise or not according to different judging methods so as to eliminate the mis-judgment, and can further prevent the fan system from operating abnormally when the input signal has the noise. The sensitivity of input signal interpretation can be adjusted according to the number of times of sampling (sampling number), the sampling cycle, the sampling time or the delay time in conjunction with the sampling parameters set in the system, and the heat dissipating efficiency of the fan system can be kept.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of adjusting sensitivity of signal interpretation applied in a fan system, the method being executed by a processor and the method comprising the steps of:

continuously receiving an input signal;

setting a sampling parameter;
sampling the input signal according to the sampling parameter to obtain a plurality of first sampling signals;
calculating a first average of the first sampling signals;
re-sampling the input signal according to the sampling parameter to obtain a plurality of second sampling signals;
calculating a second average of the second sampling signals; and
judging whether the first average and the second average are the same or not;
generating a first control signal so as to be transmitted to a fan to update a rotating speed of a fan according to the sampling signals if the first average and the second average are the same; and
generating a second control signal so as to let a fan hold an original rotating speed according to the input signal if the first average and the second average are not the same.

2. The method according to claim 1, wherein the sampling parameter comprises a sampling number, a sampling time, a sampling cycle or a delay time.

3. The method according to claim 1, wherein the sampling parameter is set externally.

4. The method according to claim 1, wherein the input signal, the sampling signal, the first control signal or the second control signal is a pulse width modulation (PWM) signal.

5. The method according to claim 1, wherein an interval time exists between the sampling signals, and a sampling time of the sampling signals is longer than two times of a cycle of the input signal.

6. A device of adjusting sensitivity of signal interpretation applied in a fan system comprising:
a receiving module for continuously receiving an input signal;
a setting module for setting a sampling parameter;
a sampling module for sampling the input signal to obtain a plurality of first sampling signals and re-sampling the input signal to obtain a plurality of second sampling signals according to the sampling parameter;
a calculating module for calculating a first average of the first sampling signals and a second average of the second sampling signals; and
a judging module for judging whether the first average and the second average are the same or not, generating a first control signal so as to be transmitted to a fan to update a rotating speed of a fan according to the sampling signals if the first average and the second average are the same, and generating a second control signal so as to let a fan hold an original rotating speed according to the input signal if the first average and the second average are not the same.

7. The device according to claim 6, wherein the sampling parameter comprises a sampling number, a sampling time, a sampling cycle or a delay time.

8. The device according to claim 6, wherein the sampling parameter is set externally.

9. The device according to claim 6, wherein the input signal, the sampling signal, the first control signal or the second control signal is a pulse width modulation (PWM) signal.

10. The device according to claim 6, wherein the receiving module, the setting module, the sampling module and the judging module are integrated in a processor.

11. The device according to claim 6, wherein the receiving module, the setting module, the sampling module and the judging module are respectively implemented by software programs or hardware circuits.

* * * * *